United States Patent
Khudyakov et al.

(10) Patent No.: US 6,470,128 B1
(45) Date of Patent: Oct. 22, 2002

(54) UV-CURABLE COATING COMPOSITION FOR OPTICAL FIBER FOR A FAST CURE AND WITH IMPROVED ADHESION TO GLASS

(75) Inventors: Igor Khudyakov; Michael Purvis, both of Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/821,154

(22) Filed: Mar. 30, 2001

(51) Int. Cl.⁷ .................................................. G02B 6/02
(52) U.S. Cl. ...................... 385/128; 385/123; 385/141; 428/378; 522/96
(58) Field of Search ................................ 385/128, 145, 385/123, 37, 141, 144; 428/387, 375, 392; 522/96, 42, 90

(56) References Cited

U.S. PATENT DOCUMENTS

| | | | |
|---|---|---|---|
| 4,537,667 A | 8/1985 | Bishop et al. ............... 525/502 |
| 4,740,055 A | 4/1988 | Kanda et al. ................ 385/128 |
| 4,824,919 A | 4/1989 | Baker et al. ................. 525/502 |
| 5,418,016 A | 5/1995 | Cornforth et al. ........... 428/378 |
| 5,773,487 A | 6/1998 | Sokol ............................ 522/42 |
| 5,812,725 A | 9/1998 | Petisce ......................... 385/128 |
| 5,913,004 A | * 6/1999 | Takase et al. ................ 385/123 |
| 5,981,738 A | 11/1999 | Cook et al. .................... 536/76 |
| 6,042,943 A | 3/2000 | Levy ............................ 428/378 |
| 6,048,660 A | 4/2000 | Leppard et al. ................ 522/8 |
| 6,057,034 A | 5/2000 | Yamazaki et al. .......... 427/515 |
| 6,110,593 A | 8/2000 | Szum et al. ................. 428/383 |
| 6,171,698 B1 | 1/2001 | Khudyakov et al. .... 385/123 X |
| 6,396,983 B1 | * 5/2002 | Atkins et al. ........... 385/145 X |

OTHER PUBLICATIONS

International Wire & Cable Symposium Proceedings by Green, et al., pp. 253–259.

* cited by examiner

*Primary Examiner*—Phan T. H. Palmer
(74) *Attorney, Agent, or Firm*—Sugrue Mion, PLLC

(57) ABSTRACT

A UV-curable coating composition including an acrylate oligomer and a vinyl acrylate compound, the latter of which can act as both a reactive diluent and an adhesion promoter. The vinyl acrylate compounds have good miscibility and low viscosity, and impart to the cured primary coating a high adhesion to glass. With the use of a free radical photoinitiator, the vinyl acrylate compound increases the speed of cure of the uncured primary coating.

44 Claims, No Drawings

UV-CURABLE COATING COMPOSITION FOR OPTICAL FIBER FOR A FAST CURE AND WITH IMPROVED ADHESION TO GLASS

BACKGROUND OF THE INVENTION

1. Field of the Invention

The invention relates to compositions for coating glass surfaces and, more specifically, coating compositions for optical waveguides such as optical fibers, the coating compositions being fast curing and having improved adhesion to glass.

2. Description of the Related Prior Art

Optical fibers made from drawn glass have been used as a reliable transmission medium in telecommunications cables. Glass optical fibers are widely used because they have the ability to carry large amounts of information over long distances.

To facilitate these long-distance transmissions, optical fiber waveguides have been coated with plastic compositions of various materials in order to protect the fiber and increase its tensile strength. Generally, to accomplish this, optical glass fibers are frequently coated with two superposed coatings. The coating which contacts the glass is a relatively soft, primary coating that must satisfactorily adhere to the fiber and be soft enough to resist microbending especially at low service temperatures. The outer, exposed coating is a much harder secondary coating that provides the desired resistance to handling forces yet must be flexible enough to enable the coated fiber to withstand repeated bending without cracking the coating.

Coatings are applied to the fiber in-line during fiber drawing. As the state of fiber drawing technology has allowed for increased draw speeds to effectuate longer and thinner optical fibers, however, the need for coating compositions that can cure at faster rates coincident with the faster draw speeds has become more urgent. Therefore, it is highly desired for an uncured primary coating to be capable of a high cure speed.

Further, the cured primary coating should exhibit good adhesion to glass to prevent delamination of the coating from the optical fiber. Delamination can be caused by excessive moisture. This is particularly devastating to optical fibers as delamination can weaken the optical glass fiber because the delaminated coating can slide against the optical glass fiber causing microscopic scratches. Ultimately, such delamination can result in a loss of optical fiber transmission.

To reduce such delamination, adhesion promoting additives have been incorporated into coating compositions. Typically silane adhesion promoters have been used. However, it is known in the field that the use of adhesion promoters can reduce the speed of cure of a coating composition.

While the conventional coating compositions have been adequate for most applications, it would be desirable to be able to formulate coating compositions for optical glass fibers that not only possess good adhesion to glass, but also maintain a high rate of cure.

The use of acrylate oligomers with a polyester or polyether backbone for primary optical fiber coating is known in the field (see U.S. Pat. Nos. 5,418,016; 5,650,231; 6,042,943 and 6,048,911). Further, such acrylate oligomers are readily commercially available from a number of manufacturers.

The use of free radical photoinitiators for coating compositions for optical fibers is known in the field (see U.S. Pat. No. 6,042,943) and many such photoinitiators are readily commercially available from a number of manufacturers.

Radiation curable optical glass fiber coating compositions containing adhesion promoters are known. U.S. Pat. No. 4,849,462 discloses a UV-curable polyurethane polyacrylate containing about 0.5 to 5.0% by weight of a mercapto polyalkoxysilane.

U.S. Pat. No. 5,812,725 discloses increasing the adhesion of a radiation cured coating for optical glass fibers by the use of an electron beam to adjust the level of adhesion between the primary coating and a surface treated glass optical fiber. This patent generally discloses the use of a reactive diluent which can be a low viscosity acrylate monomer containing at least one functional group capable of polymerization when exposed to actinic radiation. Further the invention provides for an additional adhesion promoter, but does discuss that such may be unnecessary because of the use of the electron beam to pre-treat the glass fiber. However, there is no disclosure of vinyl acrylate specifically.

U.S. Pat. No. 4,824,919 discloses that a curable composition can include from about 4.5 to 60 part by weight of a long list of vinyl monomers, including, inter alia, vinyl acrylate, and a vinyl ether, such as the 3:1 adduct of methacrylic acid with tris(4-glycidyloxyphenyl)methane. The curable composition may include a minor amount of a toughness-imparting oligomeric urethane.

U.S. Pat. No. 5,981,738 discloses the use of ethylenically unsaturated solvents, including vinyl acrylates, capable of free radical addition with maleate or fumarate pendant groups on modified cellulose esters to prepare a UV-curable coating. The amounts of said ethylenically unsaturated solvents used are from between 50 to 90 wt % of the total coating composition.

U.S. Pat. No. 5,418,016 discloses the use of a N-vinylformamide (NVF) monomer as a reactive diluent, blended with oligomer systems and a photoinitiator to form a radiation curable composition.

U.S. Pat. No. 6,171,698 B1 discloses a radiation curable coating composition having good adhesion. The composition includes a hydrolyzed coupling agent mixture.

SUMMARY OF THE INVENTION

The present invention provides a new coating composition for optical fibers and optical fibers coated therewith, whereby the coating composition is fast curing and has improved adhesion to glass.

The coating composition comprises a radiation curable oligomer and a vinyl acrylate compound that can act as both a reactive diluent and an adhesion promoter, the vinyl acrylate compound having the following formula

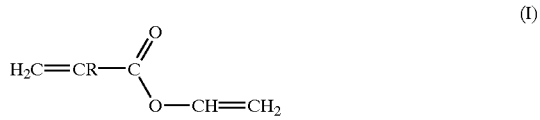

(I)

wherein R is hydrogen or an alkyl group having 1 to 10 carbon atoms. Vinyl acrylate compounds in accordance with the present invention have good miscibility and low viscosity and impart to the cured primary coating a high adhesion to glass, therefore reducing and in some instances even eliminating the need for additional reactive diluent and/or adhesion promoter. With the use of a free radical photoinitiator, the vinyl acrylate compounds increase the speed of cure of the uncured coating in comparison with conventional coating compositions without a vinyl acrylate compound. Cured coating prepared from coating compositions in accordance with the present invention have good adhesion to glass and good stress characteristics.

DETAILED DESCRIPTION OF THE PREFERRED EMBODIMENTS

The present invention provides a UV-curable coating formulation for optical fiber. The coating includes a radiation curable oligomer, preferably a urethane acrylate and more preferably a difunctional urethane acrylate with a polyester, polyether, polycarbonate, polybutadience, hydrogenated polybutadience, hydrocarbon or silicone backbone, and a vinyl acrylate compound. Applicants have discovered that vinyl acrylate compounds as defined herein, are very good reactive diluents, as they are very miscible and have low viscosity (less than 1 cP). Further, during homopolymerization or copolymerization, the vinyl acrylate compound reacts as an acrylate but with the vinyl ether group staying intact. Applicants have also discovered that the addition of a vinyl acrylate compound imparts very good properties to coatings, namely good adhesion to glass. While not wishing to be bound by theory, it is believed that this is due to the presence of non-reacted double bonds in the polymerized vinyl acrylate compound that are capable of forming $\pi$-bonds with active atoms of a glass surface.

Applicants have discovered that the addition of a vinyl acrylate compound to a coating composition allows not only to dilute it, but also helps to expedite curing. Vinyl acrylate, for example, is photosensitive and when irradiated with UV light produces polymer, i.e., polyvinyl acrylate with, as mentioned above, the vinyl ether group staying intact, as can be appreciated from the following:

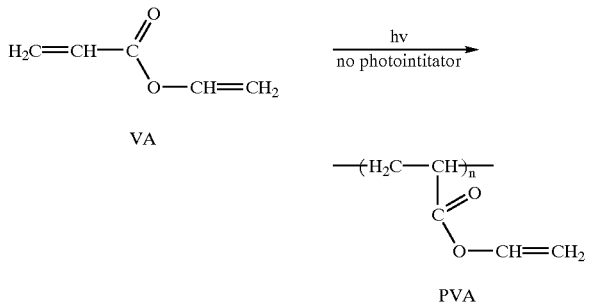

Wherein:

VA=vinyl acrylate; and

PVA=polyvinyl acrylate.

In a coating composition, the vinyl acrylate compound copolymerizes with other acrylates including the main oligomer, reactive diluents, etc. In the present invention, the vinyl acrylate compound may be present in an amount of about 2 to about 25 wt. %, more preferably, about 5 to about 15 wt. %, and more preferably, about 8 to about 12 wt. %, based upon the total weight of the composition. Of course, as one skilled in the art will recognize, the particular amount of vinyl acrylate compound will depend upon the efficiency of cure and the desired properties of the cured coating.

Suitable vinyl acrylate compounds for use in the present invention such as, for example, vinyl acrylate, are available from Aldrich, Milwaukee, Wis.

Vinyl acrylate compounds suitable for use in the present invention include compounds within the following formula (I):

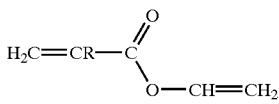

wherein R is hydrogen or an alkyl group having 1 to 10 carbon atoms. Preferably, the vinyl acrylate compound is vinyl acrylate (i.e., R is hydrogen) or vinyl methacrylate (i.e., R is a methyl group).

Further, although the present invention is described herein in the context of a primary coating, as one skilled in the art will recognize, the invention is not limited thereto. As appropriate, the coating composition in accordance with the present invention may be used as a secondary coating composition.

Cured primary coatings in accordance with the present invention preferably have a glass transition temperature ($T_g$) of from about $-80°$ C. to about $0°$ C., more preferably from about $-70°$ C. to about $-10°$ C., and most preferably about $-60°$ C. to about $-40°$ C., and a low modulus of elasticity of from about 0.2 MPa to about 3 MPa, more preferably from about 0.5 MPa to about 2.0 MPa and most preferably about 1.0–1.5 MPa.

Primary coating compositions in accordance with the present invention include a radiation curable oligomer, more preferably, a urethane acrylate oligomer with a molecular weight preferably ranging from about 500 to about 20,000, more preferably from about 5,000 to about 20,000, and most preferably about 5,000 to about 15,000, based upon the specific requirements of the properties of the primary and/or secondary coating in accordance with the present invention (unless otherwise noted, all molecular weights expressed herein are weight average molecular weights). The polydispersity of the acrylate oligomer used in the coating compositions in accordance with the present invention preferably ranges from about 1.1 to about 1.8, more preferably from about 1.1 to about 1.6, and most preferably about 1.2–1.3. Formulation of a primary coating upon addition of a vinyl acrylate compound and other acrylate reactive diluents, if desired, has a zero-shear viscosity ($\eta_0$) of about $1\times10^2$ to about $1\times10^4$, more preferably about $5\times10^2$ to about $9\times10^3$, and most preferably about $5\times10^3$ cP, at 45–50° C., as measured by a rheometer or a viscometer, usually by Brookfield viscometer.

The radiation curable oligomer is preferably present in the coating composition of the present invention in an amount of about 40 wt. % to about 95 wt. %, more preferably about 50 wt. % to about 90 wt. %, and most preferably about 60 wt. % to about 80 wt. %, based upon the total weight of the coating composition.

The urethane acrylate oligomer of the present invention may be formed by reacting a polyol, for example a diol, with a multifunctional isocyanate, for example, a disocyanate, and then end-capping with a hydroxy-functional acrylate.

The polyol may be a polyether polyol, a polyester polyol, a polycarbonate polyol, a hydrocarbon polyol, a polybutadiene polyol, co-polymers of the previously listed polyols, and mixtures of the foregoing.

The polyol may be a polyol with a number average molecular weight of about 200–10,000 g/mol.

The polyether polyols may be homopolymers or copolymers of alkylene oxides including $C_2$ to $C_5$ alkylene oxides such as, for example, ethylene oxide, propylene oxide, butylene oxide, tetrahydrofuran, and 3-methyltetrahydrofuran; homopolymers or copolymers of the above alkylene oxides obtained by using, as an initiator, $C_{14}$ to $C_{40}$ polyols, such as 12-hydroxystearyl alcohol and hydrogenated dimerdiol; and adducts of the above alkylene oxides with bisphenol-A or hydrogenated bisphenol-A. These polyether polyols may be used alone or in combination of two or more. Other suitable polyether polyols will be apparent to one skilled in the art.

The polyester polyols may be, for example, addition reaction products of a diol component and a lactone, reaction products of the diol component and a polyvalent carboxylic acid, and addition reaction products of three components, including the diol component, a dibasic acid, and the lactone. The diol component may be $C_2$ to $C_{40}$ aliphatic diols with a low molecular weight such as ethylene glycol, propylene glycol, diethylene glycol, dipropylene glycol, 1,4-butanediol, 1,5-pentanediol, 3-methyl-1,5-pentanediol, 2,4-diethyl-1,5-pentanediol, 1,6-hexane glycol, neopentyl glycol, 1,9-nonanediol, 1,10-decanediol, 12-hydroxystearyl alcohol, and hydrogenated dimerdiol; and an alkylene oxide adduct of bisphenol-A. The lactone may be, for example, epsilon-caprolactone, delta-valerolactone, and beta-methyl-delta-valerolactone. The polyvalent carboxylic acid may be, for example, aliphatic dicarboxylic acids such as succinic acid, adipic acid, azelaic acid, sebacic acid, and dodecanedioic acid; and aromatic dicarboxylic acids such as hexahydrophthalic acid, tetrahydrophthalic acid, ophthalmic acid, isophthalic acid, and terephthalic acid. Other suitable polyester polyols will be apparent to one skilled in the art.

The polycarbonate polyols may be, for example, polycarbonate diols which are obtainable by a reaction of a short chain dialkylcarbonate and a component selected from aforementioned polyether polyols, polyester polyols and diol components such as 2-methylpropanediol, dipropylene glycol, 1,4-butanediol, 1,6-hexanediol, 3-methyl-1,5-pentanediol, neopentyl glycol, 1,5-octanediol, and 1,4-bis-(hydroxymethyl)cyclohexane. The short chain dialkylcarbonate may be $C_1$–$C_4$ alkylcarbonates such as, for example, dimethylcarbonate and diethylcarbonate. Other suitable polycarbonate polyols will be apparent to one skilled in the art.

If desired, polyols with a relatively low molecular weight may be used. Examples of polyols with a relatively low molecular weight include ethylene glycol, propylene glycol, tripropylene glycol, 1,3- or 1,4-butanediol, neopentyl glycol, 1,6-hexanediol, 1,9-nonanediol, 1,10-decanediol, higher fatty acid polyols and higher hydrocarbon polyols such as castor oil, coconut oil, monomyristins (1-monomyristin and 2-monomyristin), monopalmitins (1-monopalmitin and 2-monopalmitin), monostearins (1-monostearin and 2-monostearin), monooleins (1-monoolein and 2-monoolein), 9,10-dioxystearic acid, 12-hydroxyricinoleyl alcohol, 12-hydroxystearyl alcohol, 1,16-hexadecanediol (juniperic acid or a reduction product of thapcic acid), 1,21-henicosanediol (a reduction product of Japanese acid), chimyl alcohol, batyl alcohol, selachyl alcohol, and dimeric acid diol. Other suitable polyols with a relatively low molecular weight will be apparent to one skilled in the art.

The polybutadiene polyol may be, for example, hydroxyl-terminated, fully or partially hydrogenated 1,2-polybutadiene or 1,2-polybutadiene polyol hydrogenated to an iodine number of from 9 to 21.

The multi-functional isocyanate used in the present invention may be, for example, an aromatic polyisocyanate, an aromatic aliphatic polyisocyanate, an alicyclic polyisocyanate, and an aliphatic polyisocyanate.

Examples of the aromatic polyisocyanate include diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, and 4,4'-diphenyl ether diisocyanate; and polyisocyanates such as triphenylmethane-4,4',4"-triisocyanate, 1,3,5-triisocyanatebenzene, 2,4,6-triisocyanatetoluene, and 4,4'-diphenylmethane-2,2',5,5'-tetraisocyanate.

Examples of the aromatic aliphatic polyisocyanate include diisocyanates such as 1,3- or 1,4-xylylene diisocyanate or mixtures thereof and 1,3- or 1,4-bis(1-isocyanate-1-methylethyl)benzene or mixtures thereof; and polyisocyanates such as 1,3,5-triisocyanatemethylbenzene.

Examples of the alicyclic polyisocyanate include diisocyanates such as 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate), 4,4'-methylenebis(cyclohexyl isocyanate), methyl-2,4-cyclohexane diisocyanate, methyl-2,6-cyclohexane diisocyanate, and 1,3- or 1,4-bis (isocyanatemethyl)cyclohexane; and polyisocyanates such as 1,3,5-triisocyanatecyclohexane, 1,3,5-trimethylisocyanatecyclohexane, 2-(3-isocyanatepropyl)-2,5-di(isocyanatemethyl)-bicyclo(2.2.1)heptane, 2-(3-isocyanatepropyl)-2,6-di(isocyanatemethyl)-bicyclo(2.2.1) heptane, 3-(3-isocyanatepropyl)-2,5-di(isocyanatemethyl)-bicyclo(2.2.1)heptane, 5-(2-isocyanateethyl)-2-isocyanatemethyl-3-(3-isocyanatepropyl)-bicyclo(2.2.1) heptane, 6-(2-isocyanateethyl)-2-isocyanatemethyl-3-(3-isocyanatepropyl)-bicyclo(2.2.1)heptane, 5-(2-isocyanateethyl)-2-isocyanatemethyl-2-(3-isocyanatepropyl)-bicyclo(2.2.1)heptane, and 6-(2-isocyanateethyl)-2-isocyanatemethyl-2-(3-isocyanatepropyl)-bicyclo(2.2.1)heptane.

Examples of the aliphatic polyisocyanate include diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatemethylcaproate; and polyisocyanates such as lysine ester triisocyanate, 1,4,8-triisocyanateoctane, 1,6,11-triisocyanateundecane, 1,8-diisocyanate-4-isocyanatemethyloctane, 1,3,6-triisocyanatehexane, and 2,5,7-trimethyl-1,8-isocyanate-5-isocyanatemethyloctane.

Moreover, derivatives from the above polyisocyanates can be used. Examples of the derivatives include a dimer, a trimer, biuret, allophanate, carbodiimide, polymethylenepolyphenyl polyisocyanate (referred to as crude MDI or polymeric MDI), crude TDI, and an adduct of an isocyanate compound and a polyol with a low molecular weight.

The hydroxy-functional acrylate may be, for example, 2-hydroxyethyl (meth)acrylate, 2-hydroxypropyl (meth) acrylate, 2-hydroxybutyl (meth)acrylate, 4hydroxybutyl (meth)acrylate, pentanediol mono(meth)acrylate, 2-hydroxy-3-phenyloxypropyl (meth)acrylate, 2-hydroxyalkyl(meth)acryloyl phosphate, 4-hydroxycyclohexyl (meth)acrylate, cyclohexanedimethanol mono(meth)acrylate, neopentyl glycol mono(meth) acrylate, trimethylolpropane di(meth)acrylate, and pentaerythritol tri(meth)acrylate. Additional examples include compounds which are obtainable by an addition reaction of a glycidyl group-containing compound and a (meth)acrylic acid, such as alkyl glycidyl ether and glycidyl (meth) acrylate. The above hydroxyl group-containing (meth) acrylates may be used alone or in combination of two or more.

Suitable multifunctional isocyanates are toluene diisocyanate (TDI), isophorone diisocyanate (IPDI), and 4,4' methylene dicyclohexyl diisocyanate (Desmophen W., Bayer Co., Pittsburg, Pa. USA). Suitable unsaturated monomers containing a hydroxyl group or groups are hydroxyethylacrylate (HEA) and hydroxyethylmethacrylate (HEMA). Suitable polyols are 1,6 hexanediol (Bayer Co. USA), PTG-L 1000 (polyether)(Hodogaya Chemical Co. of Japan), Duracarb™ 122 (Polycarbonate)(PPG Ind, USA), polycaprolactones such as the Tone™ polyester series manufactured by Union Carbide Co. USA, and polybutadiene polyols available from Shell Co. USA as Kraton™.

The urethane acrylate oligomer resin useful in accordance with the present invention may have the following general formula (X):

$$R^1-(I^1-P-)_n-I^2-R^2 \quad (X)$$

wherein $R^1$=independently, radiation curable functionality, such as hydroxyl ethyl acrylate or hydroxyl ethyl methacrylate $R^2$=independently, radiation curable functionality such as hydroxyl ethyl acrylate or hydroxyl ethyl methacrylate $I^{1,2}$=isocyanate such as isophorone diisocyanate, 4,4'-methylene dicyclohexyl diisocyanate or toluene diisocyanate, P=polyether polyol, polyester polyol, polycarbonate polyol, hydrocarbon polyol, polybutadiene polyol, co-polymer polyols of the same and mixtures of the same, depending on the polyol selected.

Suitable polyester diol, polyether, polybutadiene and copolymer diol materials for use in the present invention include:

$$OH-CH_2-(CH_2-\underset{\underset{O}{\|}}{C}-O-CH_2-CH_2-\underset{\underset{O}{\|}}{C}-O-CH_2-CH_2)_{\overline{n}}CH_2-OH$$

where n=1 to 40
Polyester diol $$OH-CH_2-(CH_2-CH_2-O-CH_2-CH_2-CH_2-O-CH_2-CH_2)_n-CH_2-OH$$

where n=1 to 40
Polyether diol $$OH-(CH_2-CH_2-CH_2-CH_2-CH_2)-OH$$

Polybutadiene diol $$OH-CH_2-(CH_2-O-CH_2-CH_2)_{\overline{m}}CH_2-O-CH_2-(CH_2-CH-O-CH_2-CH_2-\underset{\underset{O}{\|}}{C}-CH_2)_{\overline{n}}CH_2-OH$$

where m and n each are 1 to 40
Copolymer diol

Suitable polyether-based, aliphatic urethane diacrylate compounds for use in the present invention are available from UCB Chemical Corp., of Smynra, Ga. They are sold under the name Ebercryl and include Ebecryl 230. Other polyether-based, aliphatic urethane diacrylate compounds suitable for use in the present invention will be apparent to one skilled in the art. In this regard, other suitable polyether-based, aliphatic urethane diacrylate compounds are disclosed in U.S. Pat. Nos. 4,284,731, 4,624,994, 4,607,084, 4,525,258, the disclosures of which are all incorporated herein by reference. Polyester-based, aliphatic urthane acrylate oligomers are available from Sartomer of Exton, Pa. or from Henkel, Ambler, Pa. They are sold under the name CN966XXX, including CN966J75, and Photomer 6010, respectively.

Coating compositions in accordance with the present invention will cure without a photoinitiator, albiet after a relatively long period of time. Accordingly, a free radical-type photoinitiator is used in the present invention to initiate polymerization of the urethane acrylate main oligomer and vinyl acrylate compound, and possibly other reactive diluents, if present to tailor the properties of the coating to a particular result. Suitable free radical-type photoinitiators for use in the present invention include, for example, phosphine oxide-type photoinitiators and aromatic ketone-type photoinitiators. The phosphine oxide-type of photoiniators may be a benzoyl diaryl phosphine oxide photoiniator, such as (2,4,6-trimethylbenzoyl)diphenylphosphine oxide (Lucerin TPO available from BASF), or other phosphine oxide-type photoinitiator, such as bis(2,4,6-trimethylbenzoyl)phenyphosphine oxide (Irgacuce 819 available from Ciba Additives of Tarrytown, N.Y.), or bis (2,6-dimethoxybenzoyl)-2,4,4-trimethylpentylphosphine oxide, and mixtures of phosphine oxide-type free radical photoinitiators.

Examples of aromatic ketone-type free radical photoinitiators that may be used in the present invention include:

2-benzyl-2-N,N-dimethylamino-1-(4-morpholinophenyl)-1-butanone;
1-hydroxycyclohexylphenyl ketone;
2-hydroxy-2-methyl-1-phenylpropan-1-one;
dimethoxyphenylacetophenone;
2-methyl-1-[4-methyl thio)-phenyl]-2-morpholinopropanone-1;
1-(4-isopropylphenyl)-2-hydroxy-2-methylpropan-1-one;
1-(4-dodecyl-phenyl)-2-hydroxy-2-methylpropan-1-one;
4-(2-hydroxyethoxy)phenyl-2(2-hydroxy-2-propyl)-ketone;
diethoxyphenyl acetophenone;
2,4,6-trimethylbenzoyl)diphenylphosphine oxide;

and mixtures of the foregoing.

Also, the photoinitiator may be mixture of phosphine oxide-type free radical photoinitiator and aromatic ketone-type free radical photoinitiator, such as a mixture of (2,6-dimethoxy benzoyl)-2,4,4 trimethylpentylphosphineoxide and 2-hydroxy-2-methyl-1-phenyl-propane-1-one (Irgacure 1700 available from Ciba Additives, Tarrytown, N.Y., which is a mixture of 25 wt. % of the former and 75 wt % of the latter).

Preferably, the free radical photoinitiator is (2,6-dimethoxy benzoyl)-2,4,4 trimethylpentylphosphineoxide or a mixture of (2,6-dimethoxy benzoyl)-2,4,4 trimethylpentylphosphineoxide and 2-hydroxy-2-methyl-1-phenyl-propane-1-one. Free radical-type photoinitiators suitable for use in the present invention are available from Ciba Additives of Tarrytown, N.Y. They are sold under the names Irgacure® and Darocur®. Other suitable free radical-type photoinitiators will be apparent to one skilled in the art.

The free radical type photoinitiator is preferably present in the coating composition of the present invention in an amount of about 0.1 wt. % to about 20 wt. %, more preferably about 0.5 wt. % to about 10 wt. %, and most preferably about 1.0 wt. % to about 5.0 wt. %, based upon the total weight of the coating composition.

The coating composition in accordance with the present invention may include one or more reactive diluents in addition to the vinyl acrylate. That is, the use of the vinyl acrylate in a coating composition in accordance with the present invention may be in place of a conventional reactive diluent that might be utilized but, of course, the use of additional reactive diluent is within the scope of the present invention. In this regard, while not wishing to be bound by theory, it is believed that, during the polymerization of the urethane acrylate oligomer, additional reactive diluent hooks together chains of the urethane acrylate oligomer. In any event, under some circumstances, the formulator might find that adequate curing of the coating compositions of the present invention is ensured by the presence of additional reactive diluent as it functions as a solvent improving the solubility of the urethane acrylate oligomer in solution. The use of additional reactive diluent also allows the formulator to adjust the viscosity of the solution to improve processability. The additional reactive diluent may, for example, be a lower molecular weight, liquid acrylate-functional compound including one or more of the following diacrylates and monofunctional acrylates:

1, 6-hexanediol diacrylate,

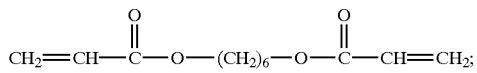

ethylene glycol diacrylate,

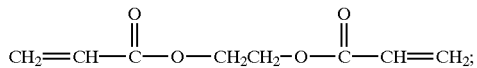

diethylene gylcol diacrylate,

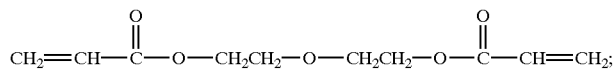

tetraethylene glycol diacrylate,

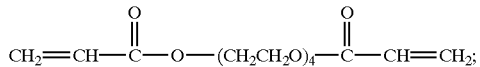

neopentyl glycol diacrylate,

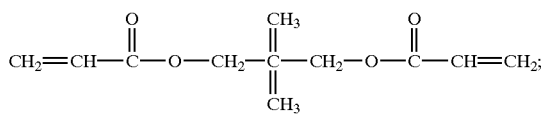

poly(butanediol) diacrylate,

1, 3-butylene glycol diacrylate,

triisopropylene glycol diacrylate,

ethoxylated bisphenol A diacrylate,

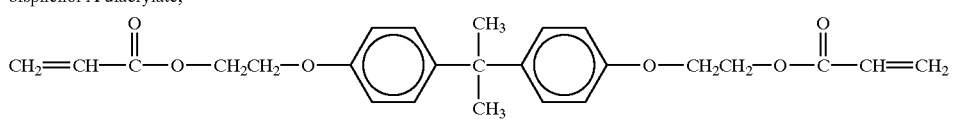

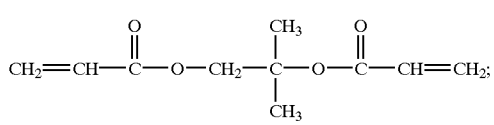

1, 4-butanediol diacrylate,

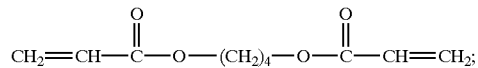

tripropylene gylcol diacrylate,

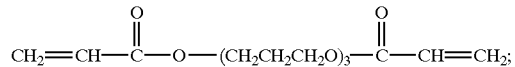

1, 4-butanediol dimethacrylate,

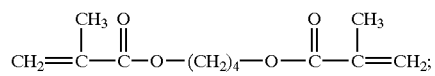

tertathylene gylcol dimethacrylate,

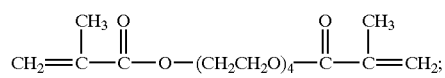

tetraethylene glycol diacrylate,

triisopropylene glycol diacrylate,

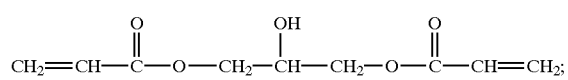

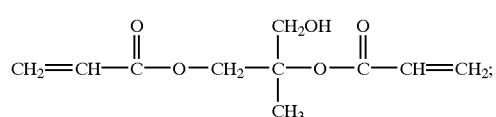

-continued

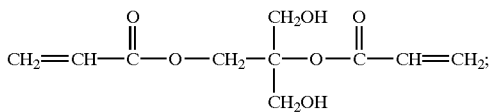

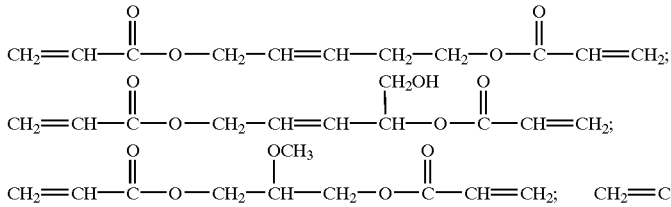

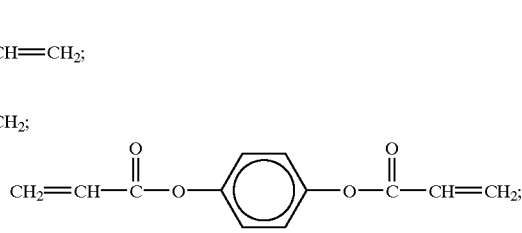

isobornyl acrylate

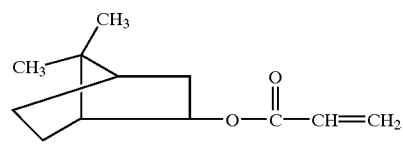

n-vinyl caprolactam

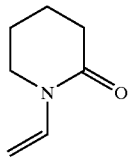

Preferably, lower molecular weight, liquid monofunctional acrylate compounds suitable for use as an additional reactive diluent in accordance with the present invention are isobornyl acrylate and n-vinyl caprolactam. Other reactive diluents suitable for use in the present invention in combination with the vinyl acrylate will be apparent to one skilled in the art.

Reactive diluent in addition to vinyl acrylate may be used in the coating composition in accordance with the present invention in an amount of from about 5 to about 80% by weight, preferably from about 5 to about 60% by weight, and most preferably about 30% by weight, based upon the total weight of the composition.

The coating compositions in accordance with the present invention may also include one or more adhesion promoters in addition to the vinyl acrylate which itself acts as an adhesion promoter in accordance with the present invention. Suitable adhesion promoters for purposes of the present invention include acid functional materials and organofunctional silanes. For example, the organofunctional silane may be an amino-functional silane, an acrylamido-functional silane, a mercapto-functional silane, an allyl-functional silane, a vinyl-functional silane, a methylacrylate-functional silane, and an acrylate-functional silane. Preferably, the organofunctional silane is mercaptoalkyl trialkoxy silane, a methacryloyxlalkyl trialkoxy silane, an aminoalkyl trialkoxyl silane, a vinyl trialkoxyl silane and mixtures thereof. More preferably, the organofunctional silane is 3-aminopropyl triethoxy silane, 3-methacryloxypropyltrimethoxy silane, gamma-mercaptopropyl trimethoxy silane, gama-mercaptopropyl (gamma-mercaptopropyl)triethoxy silane, beta-(3,4-epoxycyclohexyl)ethyl trimethoxy silane, gamma-glycidoxypropyl trimethoxy silane, 3-vinylthiopropyl trimethoxy silane, vinyl-tris-beta-methoxyethoxy)silane, vinyl triacetoxy silane, and mixtures thereof. A particularly preferred adhesion promoter is KBM 803 availiable from Shin-Etsu Silicones of America, Inc, of Torrance, Calif.

An additional adhesion promoter, if used, may be present in the coating composition in accordance with the present invention in an amount of from about 0.1 to about 10% by weight, more preferably from about 0.1 to about 3% by weight, and most preferably less than about 1% by weight, based upon the total weight of the composition.

Other components that may be utilized in the coating composition in accordance with the present invention include antioxidants, flow control agents, sensitizers, stabilizers, lubricants and wetting agents, as is conventional in the art.

The present formulation may include photosensitizers which absorb UV or visible light and transfer energy to the photoinitiators which induces additional decomposition of the photoinitiators with subsequent free radical formation. Examples of effective photosensitizers are thioxanthen-9-one, 2-isopropylthioxanthen-9-one and 10-phenylphenoxazine. The photosensitizer, if used, may be present in the coating composition in accordance with the present invention in an amount of from about 0.25 to about 10% by weight, more preferably about 0.25 to about 5% by weight, and most preferably about 1% by weight based upon the total weight of the composition.

In accordance with the present invention, the foregoing components are mixed or blended together using conventional equipment and an optical fiber may be coated with the coating composition in accordance with the present invention by any conventional optical fiber production technique. The conventional techniques usually involve a draw tower in which a preformed glass rod is heated to produce a thin fiber of glass. The fiber is pulled vertically through the draw tower and, along the way, the fiber passes through one or more coating stations at which various coatings are applied and cured in-line to the newly drawn fiber. The coating stations may each contain a die having an exit orifice that is sized to apply the particular coating to the fiber in a desired thickness. Monitoring and measuring devices may be provided near each station to ensure that the coating applied at that station is coated concentrically and to the desired diameter. Optical fiber coating techniques that may be utilized in the present invention are disclosed in U.S. Pat. Nos. 4,374,161; 5,858,053; 4,962,992; 5,104,433, the disclosures of which are incorporated herein by reference. Other suitable optical fiber coating techniques that may be utilized in the present invention would be apparent to one skilled in the art.

The invention is further illustrated by the following examples which are set forth by way of illustration only and not by way of limitation.

EXAMPLE 1

A coating composition was prepared of the following ingredients in the amounts specified in a standard manner by adding all inputs to the diisocyanate at elevated temperature:
Formulation 1
Isophorone diisocyanate(IPDI) 66.8 g;
2,6-di-tert-butyl-4-methylphenol inhibitor (Ionol) from Aldrich 1.0 g;
dibutyltin dilaurate (tin catalyst) from Aldrich 1.9 g;
Desmophen 2001KS available from Bayer (polyester, reacts with IPDI); 375.0 g;
BYK 331available from BYK Chemie USA (Wallingford, Conn.) (flow control additive) 0.05 g;
2-hydroxyethylacrylate available from Aldrich 34.8 g;
N-vinyl-2-caprolactam available from ISP, Wayne, N.J. 20.0 g;
SR339 available from Sartomer (reactive diluent) 80.0 g;
SR489 available from Sartomer (reactive diluent) 40.0 g;
SR506 available from Sartomer (reactive diluent) 40.0 g;
Irgacure 1700 available from Ciba Additives 20.0 g;
vinyl acrylate available from Aldrich 25.0 g.
Glass Adhesion Data Films of the foregoing coating composition were made on plain glass plates and allowed to rest for 7 days in a dark area in a room with controlled temperature and humidity (temperature 75° C., relative humidity RH ~50%). Adhesion of the films was determined in accordance with the method disclosed in U.S. Pat. No. 6,171,698 using an average load of 10–50 mm (N Force), was 0.84+/−0.07 N. A rather high peel off force was measured in the experiments, namely 0.84±0.07 N.

EXAMPLE 2

The following two coating compositions were prepared from the below ingredients in the amounts specified, again in a standard manner by adding all inputs to the diisocyanate at elevated temperature:
Formulation 2 (Comparative Formulation)
IPDI 48.0 g;
2,6-di-tert-butyl-4-methylphenol 0.4 g;
Benzoin (photoinitiator, reacts with IPDI) 17.0 g;
dibutyltin dilaurate (tin catalyst) 1.3 g;
Acclaim 2220N available from Bayer (polyether, poly(oxyalkylene) or polyethelene-polypropylene glycol; reacts with IPDI) 226.0 g;
BYK 331(flow control additive) 0.05 g; and,
SR495 available from Sartomer (acrylate, reacts with IPDI) 58.0 g.
Formulation 3
IPDI 48.0 g;
2,6-di-tert-butyl-4-methylphenol (inhibitor) 0.4 g;
Benzoin (photoinitiator, reacts with IPDI) 17.0 g;
dibutyltin dilaurate (tin catalyst) 1.3 g;
Acclaim 2220N available from Bayer (polyether, poly(oxyalkylene) or polyethylene-polypropylene glycol; reacts with IPDI) 226.0 g;
BYK 331 (flow control additive) 0.05 g;
SR495 available from Sartomer (acrylate, reacts with IPDI) 58.0 g; and,
10 wt. % vinyl acrylate.

Data for coating composition Formulations 2 and 3 are presented in Table I below

TABLE I

| Coating formulation | PhotoDSC (% of conversion at 40° C.)[a] | Mean secant modulus at 2.5% (MPa)[b] | Mean tensile strain at break (%)[c] | Rate constant of cure by IR at 40° C. (s$^{-1}$)[d] | Viscosity at 30° C. (cP)[e] | Viscosity at 45° C. (cP)[e] | $T_g$[f], deg C. |
|---|---|---|---|---|---|---|---|
| Formulation 2 comparative | 86.6 | 0.7 +/− −0.1 | 105.3 +/− 10.5 | 0.15 | 36,250 | 10,700 | −26 |
| Formulation 3 | 88.8 | 2.4 +/− 1.0 | 63 +/− 17 | 0.27 | 7,125 | 2,688 | −40 |

[a]A Perkin Elmer (Norwalk, CT) photoDSC DPA-7 was employed to measure heat produced during cure of coatings. An Osram Hg short arc 100 W lamp was used as the light source. Samples on a DSC pan were flushed with nitrogen for 10 min prior to irradiation. Light intensity was 40 W/cm$^2$ on a pan. Samples were irradiated with two light pulses with a duration of 0.6 s each, a time interval between pulses was 30 s. Percent of conversion was determined as a fraction of heat in percent released during the first pulse of the total heat released during two pulses. The higher is the percentage of conversion, the faster is the cure.
[b]Mean secant modulus is a mean measure of a coating's toughness prior to permanent deformation at elongation up to 2.5%
[c]Mean tensile strain at break (elongation) is the mean value of a factor by which a coating is stretched before break. A film of thickness ca. 5 mil was cast onto glass plate using a Byrd bar applicator. A minimum of 6 samples were prepared using a die to cut the samples at exact dimensions each time. Any samples with tears or imperfections were discarded. An Instron Model 5564 with pneumatic grips and Merlin software was used to measure the secant modulus and tensile strain at break. As a guideline, ASTM D638M - Tensile Properties of Plastics were used.
[d]Kinetics of cure of formulations was measured by real-time FT IR technique by disappearance upon UV-irradiation of twisting vibration bank of acrylate group at 810 cm$^{-1}$. A Nicolet 870 FT IR device from Nicolet (Madison, WI) in ATR regime, MCT/A detector was used. Thickness of a sample on a top of a crystal was 100 μm. Irradiation was provided by a full light of UV-spot light source Lightingcure 200 of Hamamatsu (Bridgewater, NJ). The light intensity on a surface of a sample was 20 mW/cm$^2$. Kinetics satisfactory followed first-order law. Simulation of kinetics with IgorPro software allowed to get first order rate constant of cure k, s$^{-1}$.

TABLE I-continued

| Coating formulation | PhotoDSC (% of conversion at 40° C.)[a] | Mean secant modulus at 2.5% (MPa)[b] | Mean tensile strain at break (%)[c] | Rate constant of cure by IR at 40° C. (s$^{-1}$)[d] | Viscosity at 30° C. (cP)[e] | Viscosity at 45° C. (cP)[e] | Tg[f], deg C. |
|---|---|---|---|---|---|---|---|

[e]Viscosity was measured using a Brookfield viscometer.
[f]Glass transition temperature was measured the following way. The storage modulus (E'), the loss modulus (E"), and the tan delta (E"/E') of the examples were measured using a Theometrics Solids Analyzer (RSA-II), equipped with:
1) A personal computer having a Windows 96 ™ operating system and having Rheometrics Orchestrator ™ software (version 6.4.3) loaded.
2) A liquid nitrogen controller system for low-temperature operation.

The test samples were prepared by casting a film of the coating having a thickness in the range of 0.02 mm to 0.4 mm, on a glass plate. The cast film was cured using an Iwasaki UV processor. A specimen approximately 25 mm in length and 6.25 mm wide was cut from a defect-free region of the cured film. The film thickness was measured at three or more locations along the length of the sample. The average film thickness was calculated to 0.001 mm. The thickness can not vary by more than 0.01 mm over this length. If the above condition was not met, the sample was discard. The width of the sample was measured at two or more locations and the average value calculated to 150 μm.

The measured geometry of the samples was entered into the Rheometrics Orchestrator™ software. The length filed was set at a value of 22.5 mm and the average values of width and thickness were entered into the appropriate fields.

The temperature sweep used included cooling the test samples to -80° C. and increasing the temperature at about 3° C. per minute until the temperature reached 100° C. The test frequency used was 62.8 rad/s.

One can see from the data of Table 1 that an additional vinyl acrylate results in acceleration of cure of coating with acceptable secant modulus and tensile strain; formulation 3 with vinyl acrylates cures faster than formulation 2.

Although the present application has been described in connection with a preferred embodiment thereof, many other variations and modifications will become apparent to those skilled in the art without departure from the scope of the invention. It is preferred, therefore, that the present invention not be limited by the specific disclosure herein, but only by the appended claims.

What is claimed is:

1. An optical waveguide have a cured coating thereon, said cured coating being prepared from a coating composition comprising a radiation curable oligomer, a free radical photoinitiator, and a vinyl acrylate compound of formula (I):

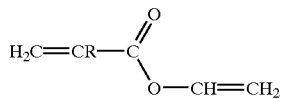

(I)

wherein R is hydrogen or an alkyl group having 1 to 10 carbon atoms, wherein said radiation curable oligomer being diluted with said compound of Formula (I), and said compound of Formula (I) being copolymerizable with said radiation curable oligomer.

2. The optical waveguide of claim 1, wherein said photoinitiator is present in said coating composition in an amount of about 0.1 to about 20 wt. % based upon the total weight of the coating composition.

3. The optical waveguide of claim 1, wherein, said radiation curable oligomer is a urethane acrylate oligomer.

4. The optical waveguide of claim 3, wherein said urethane acrylate oligomer is formed by reacting a polyol with multifunctional isocyanate and then end-capping with hydroxy-functional acrylate.

5. The optical waveguide of claim 4, wherein said polyol is selected from the group consisting of polyether polyol, polyester polyol, polycarbonate polyol, hydrocarbon polyol, polybutadiene polyol copolymers thereof and mixtures thereof.

6. The optical waveguide of claim 4, wherein said multifunctional isocyanate is selected from the group consisting of aromatic polyisocyanate, aromatic aliphatic isocyanate, alicylic polyisocyanate and aliphatic polyisocyanate.

7. The optical waveguide of claim 1, wherein in said compound of Formula (I) R is hydrogen.

8. The optical waveguide of claim 1, wherein in said compound of Formula (I) R is a methyl group.

9. The optical waveguide of claim 1, wherein said compound of Formula (I) is present in said coating composition in an amount of about 2 wt. % to about 25 wt. % based upon the total weight of the coating composition.

10. The optical waveguide of claim 1, wherein said radiation curable oligomer is present in said coating composition in an amount of about 40 wt. % to about 95 wt. % based upon the total weight of the coating composition.

11. A liquid, curable composition for coating an optical waveguide, comprising a UV curable urethane acrylate oligomer having either a polyether or polyester backbone, a free radical photoinitiator, and a compound of formula (I);

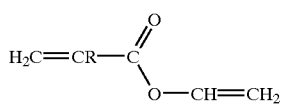

(I)

wherein R is hydrogen or an alkyl group having 1 to 10 carbon atoms, said difunctional urethane acrylate oligomer being diluted with said compound of Formula I, and said compound of Formula (I) being copolymerizable with said urethane acrylate oligomer.

12. The composition of claim 11, wherein said urethane acrylate oligomer has a polyether backbone.

13. The composition of claim 11, wherein said urethane acrylate oligomer has a polyester backbone.

14. The composition of claim 11, wherein in said compound of Formula (I) R is hydrogen.

15. The composition of claim 11, wherein in said compound of Formula (I) R is a methyl group.

16. The composition of claim 11, wherein said compound of formula (I) is present in said coating composition in an amount of about 2 wt. % to about 25 wt. % based upon the total weight of the coating composition.

17. The composition of claim 11, wherein said radiation curable oligomer is present in said coating composition in an amount of about 40 wt. % to about 95 wt. % based upon the total weight of the coating composition.

18. The composition of claim 11, wherein said photoinitiator is present in said coating composition in an amount of about 0.1 wt. % to about 20 wt. % based upon the total weight of the coating composition.

19. A cable comprising an optical fiber having a cured coating thereon, said cured coating being prepared from a coating composition comprising a radiation curable oligomer, a free radical photoinitiator, and a vinyl acrylate compound of formula (I):

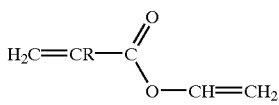

wherein R is hydrogen or an alkyl group having 1 to 10 carbon atoms, wherein said radiation curable oligomer being diluted with said compound of Formula (I), and said compound of Formula (I) being copolymerizable with said radiation curable oligomer.

20. The cable of claim 19, wherein said photoinitiator is present in said coating composition in an amount of about 0.1 to about 20 wt. % based upon the total weight of the coating composition.

21. The cable of claim 19, wherein, said radiation curable oligomer is a urethane acrylate oligomer.

22. The cable of claim 21, wherein said urethane acrylate oligomer is formed by reacting a polyol with multifunctional isocyanate and then end-capping with hydroxy-functional acrylate.

23. The cable of claim 22, wherein said polyol is selected from the group consisting of polyether polyol, polyester polyol, polycarbonate polyol, hydrocarbon polyol, polybutadiene polyol copolymers thereof and mixtures thereof.

24. The cable of claim 22, wherein said multifunctional isocyanate is selected from the group consisting of aromatic polyisocyanate, aromatic aliphatic isocyanate, alicylic polyisocyanate and aliphatic polyisocyanate.

25. The cable of claim 19, wherein in said compound of Formula (I) R is hydrogen.

26. The cable of claim 19, wherein in said compound of Formula (I) R is a methyl group.

27. The cable of claim 19, wherein said compound of Formula (I) is present in said coating composition in an amount of about 2 wt. % to about 25 wt. % based upon the total weight of the coating composition.

28. The cable of claim 19, wherein said radiation curable oligomer is present in said coating composition in an amount of about 40 wt. % to about 95 wt. % based upon the total weight of the coating composition.

29. An optical waveguide have a cured coating thereon, said cured coating being prepared from a liquid, curable composition, comprising a UV curable urethane acrylate oligomer having either a polyether backbone or polyester backbone, a free radical photoinator, and a vinyl acrylate compound of formula (I):

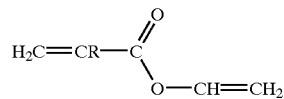

wherein R is hydrogen or an alkyl group having 1 to 10 carbon atoms, and wherein said difunctional urethane acrylate oligomer being diluted with said vinyl acrylate compound, and said vinyl acrylate compound being copolymerizable with said difunctional urethane acrylate oligomer.

30. The optical waveguide of claim 29, wherein said urethane acrylate oligomer has a polyether backbone.

31. The optical waveguide of claim 29, wherein said urethane acrylate oligomer has a polyester backbone.

32. The optical waveguide of claim 29, wherein in said compound of Formula (I) R is hydrogen.

33. The optical waveguide of claim 29, wherein in said compound of Formula (I) R is methyl group.

34. The optical waveguide of claim 29, wherein said compound of formula (I) is present in said coating composition in an amount of about 2 wt. % to about 25 wt. % based upon the total weight of the coating composition.

35. The optical waveguide of claim 29, wherein said radiation curable oligomer is present in said coating composition in an amount of about 40 wt. % to about 95 wt % based upon the total weight of the coating composition.

36. The optical waveguide of claim 29, wherein said photoinitiator is present in said coating composition in an amount of about 0.1 wt. % to about 20 wt. % based upon the total weight of the coating composition.

37. A cable comprising an optical fiber having a cured coating thereon, said cured coating being prepared from a liquid, curable composition, comprising a UV curable urethane acrylate oligomer having either a polyether backbone or polyester backbone, a free radical photoiniator, and a vinyl acrylate compound of formula (I):

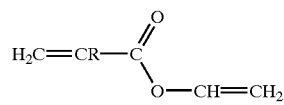

wherein R is hydrogen or an alkyl group having 1 to 10 carbon atoms, and wherein said difunctional urethane acrylate oligomer being diluted with said vinyl acrylate compound, and said vinyl acrylate compound being copolymerizable with said difunctional urethane acrylate oligomer.

38. The optical waveguide of claim 37, wherein said urethane acrylate oligomer has a polyether backbone.

39. The optical waveguide of claim 37, wherein said urethane acrylate oligomer has a polyester backbone.

40. The optical waveguide of claim 37, wherein in said compound of Formula (I) R is hydrogen.

41. The optical waveguide of claim 37, wherein in said compound of Formula (I) R is methyl group.

42. The optical waveguide of claim 37, wherein said compound of formula (I) is present in said coating composition in an amount of about 2 wt. % to about 25 wt. % based upon the total weight of the coating composition.

43. The optical waveguide of claim 37, wherein said radiation curable oligomer is present in said coating composition in an amount of about 40 wt. % to about 95 wt % based upon the total weight of the coating composition.

44. The optical waveguide of claim 37, wherein said photoinitiator is present in said coating composition in an amount of about 0.1 wt. % to about 20 wt. % based upon the total weight of the coating composition.

* * * * *